United States Patent Office 3,149,161
Patented Sept. 15, 1964

3,149,161
CATALYTIC REDUCTION OF 3-CHLORONITRO
BENZENE
David E. Graham, Westfield, N.J., Harlan B. Freyermuth,
Easton, Pa., and James B. Normington, Little Silver,
N.J., assignors to General Aniline & Film Corporation, New York, N.Y., a corporation of Delaware
No Drawing. Filed Oct. 27, 1960, Ser. No. 65,277
12 Claims. (Cl. 260—580)

This invention relates to an improved method for the reduction of chloronitro benzenes, and in particular to an improvement in the catalytic hydrogenation of such compounds containing the chlorine and nitro substituents meta to each other to the corresponding amino compound, and is further particularly concerned with an improved process whereby this reduction is carried out in the liquid phase and in the presence of the water of reaction as a second discrete liquid phase, no other solvent or diluent being added.

Aromatic nitro compounds have long been reduced to the corresponding aromatic amines by a great number of different methods, such as for example by the use of iron borings and dilute acid. In addition, zinc, tin and stannous chloride, with or without acid, alkaline sulfides and a great variety of other reducing agents have been used. New techniques have been developed within recent years employing molecular hydrogen with various catalysts to effect the direct reduction of nitro compounds to the amines. Such catalytic hydrogenation techniques offer many advantages over the previously employed chemical methods, especially with respect to economy, versatility, operating complexities, separation of products, and the ease of adaptation to continuous processing. Such catalytic hydrogenation techniques have been used with the aromatic nitro compounds in both liquid and the vapor phase, and a great number of different catalyst systems have been suggested as suitable for the different techniques, primarily because of many inherent disadvantages which come to the front in the use of the catalytic hydrogenation technique. The major problems encountered in the catalytic reduction of aromatic nitro compounds are the fouling of the catalyst or its inactivation, and the production of undesired by-products and side reactions necessitating extremely careful control of operating conditions such as catalyst concentration, catalyst purity, purity of nitro compound, temperatures, pressures, selected solvents and diluents where employed, and the like. By far, the greatest difficulties have been encountered in preventing inactivation of the catalyst by products formed during the reaction such as water, and by the undesired by-products of the reaction which may result in forming undesirable high temperature build-up within the reaction zone in localized areas. Since the reduction of nitro compounds is an exothermic one, it has heretofore been considered essential to operate within careful limits of temperature in order to prevent a running away of the reaction with the possibliity of a subsequent explosion. To obviate such a situation, it has been proposed to employ various solvents and diluents in the reaction zone to moderate the rise of temperature during the reduction stages.

Among the catalyst systems most widely employed have been those using nickel or other base metals as the active catalytic material. These catalysts usually require rather drastic conditions of temperature and pressure and quite high concentrations of metal to effect the necessary and desired reduction of nitro compounds to the corresponding amines. One of the major factors in obtaining good yield of amine within reasonable conditions of temperature and pressure is adequate contact between the catalyst, the nitro compound and hydrogen within the reaction zone. Among the suggested methods for maintaining good contact has been the use of packed towers and other fixed bed catalyst systems wherein the flow liquid nitro compound and hydrogen is so provided as to result in a large contact area between the catalyst and the hydrogen and nitro compound. With the nickel catalyst systems heretofore employed it has been found that the water of reaction tends to cause agglutination of the catalyst and thus retard the speed of the reaction. To overcome this, various techniques have been devised, among them the removal of the water as vapor formed during the reaction to prevent the formation of a separate aqueous phase, see U.S. Patent 2,292,879. In U.S. Patent 2,458,214, control of the reaction temperature is effected by means of the injection of an inert liquid such as water into the reaction zone and the removal thereof in the form of steam so that there is no separate aqueous phase in the reaction zone.

It has now been discovered that chloronitro benzenes of the formula:

wherein X is alkyl of 1 to about 18 carbon atoms and $n=0$ to 4, may be catalytically hydrogenated and thereby reduced to the corresponding amino compound in undiluted form at moderate temperatures and pressures employing noble metal catalyst provided the reaction is carried out in a highly stirred reaction zone so that the water formed during the reaction remains well dispersed throughout the liquid in the reaction zone as a separate and distinct liquid phase. It is preferred that the reaction zone be further provided with some means of cooling to remove the heat of reaction. The process for this invention thereby provides a means for effecting reduction of chloronitro benzenes which eliminates the cost of solvents, the contamination of products by solvents, the poisoning of catalysts by solvents, the hazards of volatile inflammable solvents, the poisoning and inactivation of catalysts by undesirable by-products, the inactivation of the catalyst due to the water formed during their reduction, and finally, the need for elaborate and complex techniques for controlling the temperature of the reaction and the removal of the water formed during the reduction. The yields obtainable by the process of the present invention are substantially quantitative and the products produced thereby are of an excellent quality. It is indeed remarkable and completely unobvious that the hydrogenation can be carried out effieciently, simply, and safely by the process of the present invention and that it is not retarded in any way by the presence of the separate aqueous phase. Not only does the latter not interfere with the rate of reduction, and as a consequence provide a technique which effects a reduction at a constant rate, but it appears to offer many advantages by way of temperature control and the lack of reduction of any undesirable side reactions and reaction products. The present process is not only adapted for batch operation but it is particularly well suitable to a continuous reduction technique.

It is therefore an object of the present invention to provide a process for the catalytic hydrogenation of m-chloronitro benzenes.

It is still another object of the present invention to provide a simple and efficient process for catalytically hydrogenating m-chloronitro benzenes in the liquid phase.

It is still another object of the present invention to provide a catalytic hydrogenation process for the production of m-chloroamino benzenes in the absence of any added solvent or diluent which is safe and efficient.

It is still a further object of the present invention to provide a process to effect the catalytic hydrogenation employing noble metal catalysts of m-chloronitro benzenes in the absence of any added solvent or diluent which is safe and efficient and does not require complex techniques for removal of the water of reaction during the course of the reduction.

Other objects will appear hereinafter as the description proceeds.

The catalysts which are contemplated herein are the noble metals of the platinum group and include platinum, palladium, ruthenium and rhodium. The catalysts are usually employed on a suitable support in a concentration of from about 0.1% to about 10% by weight based on the weight of the support and preferably from about 1% to about 5%. Suitable supports are well known in the art and include carbon and alumina. The catalyst system employed should have a surface area of at least about 150 square meters per gram, which characterizes such catalysts as being of the high surface area type. Any of the standard preparations of catalyst may be used. The supported catalysts may be pelleted, granular or powder. They may be on the outside of the support or distributed throughout it. Some of the catalysts which may be employed are exemplified by the following:

Platinum black—Sabatier-Reid, Catalysis in Organic Chemistry. D. Van Nostrand Co., New York, 1922.
Platinum oxide—Adams, Vorhees and Shriner, Organic Syntheses, Coll. vol. 1, p. 452. John Wiley & Sons, New York, 1932.
Palladium on charcoal—Mannich & Thiele, Ber. Deutches pharm. Ges. 26 36–48 (1916).
Platinum on charcoal—Ellis, U.S. Patent 1,174,245.
Platinum or palladium on alumina—Schwaroman, U.S. Patent 1,111,502.

As pointed out above, the present process employs no added solvent or diluent but is operable directly upon the undiluted nitro compound. The temperature range suitable during the course of the reduction is from about 25° C. to about 125° C. and the pressure employed may range from atmospheric to about 150 pounds per square inch gage. Increased pressures may be used but since the rate of reaction is not to be increased, no advantage is to be gained thereby.

In order to effect the desired dispersion of the water formed during the course of the reaction throughout the reaction mass it is necessary to carry out the reaction in the presence of a high degree of suitable agitation. Any means for effecting a well dispersed state of water may be resorted to. In addition to the usual agitation means, one may also employ supersonics in lieu of conventional mechanical agitators. When employing the latter, a peripheral speeding within the liquid of about 500 to 800 feet per minute will produce a suitable and adequate dispersion of the water as a separate and distinct liquid phase.

Suitable compounds for reduction include:

3-chloronitro benzene
5-chloro-3-nitro toluene
4-chloro-2-nitro toluene
2-chloro-4-nitro toluene
6-chloro-4-nitro-1,2-dimethyl benzene
4-chloro-2-nitro-1,3-dimethyl benzene
6-chloro-4-nitro-1,3-dimethyl benzene
4-chloro-2-nitro-1,3,5-trimethyl benzene and the like.

The following examples will serve to illustrate the present invention without being deemed limitative thereof. Where parts are used, they are to be interpreted as parts by weight unless otherwise indicated.

*Example 1*

Into an 8 liter reactor there is charged 4500 g. of 3-chloronitro benzene, 200 g. sodium acetate and 4.5 g. of 5% palladium on carbon catalyst. The temperature of the reactor is then raised to 80° C. and pressured with hydrogen to 75 p.s.i.g. The reaction mixture is then stirred at 1500 r.p.m. to effect a dispersion throughout the reaction mass of the water as it is formed during the reduction. Hydrogen pressure is maintained at 75 p.s.i.g. by the introduction of hydrogen over a period of 4 hrs. Thereafter the reactants are cooled, discharged from the reactor, and filtered to separate the catalyst. The water of reaction is separated from the oil layer and distillation of the latter yields 3460 g. of 3-chloroaniline with the following analysis:

Percent 3-chloronitro benzene (titanous chloride)__ nil
Purity (diazo method) _____percent__ 99.5

The yield of 3-chloroaniline is about 95%. The catalyst which is recovered is reused and shows virtually the same activity in subsequent runs.

*Example 2*

Example 1 is repeated employing, however, in place of 3-chloronitro benzene, 4-chloro-2-nitro toluene. Similar outstanding yields of 4-chloro-orthotoluidine are obtained.

*Example 3*

Examples 1 and 2 are repeated employing in lieu of the catalysts of these examples, 10.0 g. of a 5% palladium on alumina catalyst. Comparable results are obtained.

*Example 4*

Examples 1 and 2 are once again repeated employing, however, 15 g. of the catalyst employed in those examples while maintaining the temperature of reaction at 50° C. in place of the 80° C. used in those examples. Excellent yields are forthcoming.

*Example 5*

Example 1 is once again repeated carrying out the process, however, in a continuous manner using 20 g. of a 5% palladium on carbon catalyst for the initial 4500 g. charge of 3-chloronitro benzene. The throughput rate is maintained at 4000 g. of nitro compound per hour; temperature 80° C. and pressure 50 p.s.i.g. The catalyst is retained in the reactor by means of a microporous metal filter which permits withdrawal of the amine product to the exclusion of the catalyst. The very good yield of chlorotoluidine is obtained containing less than 0.2% nitro compound.

*Example 6*

Example 5 is repeated employing a cascade series of reactors in place of the single reactor of Example 5. Residence time is approximately 1 hour in the first reactor and about 30 minutes in the second and final one. The yield of amine reduction product is better than 99% with no trace of nitro bodies. The second reactor contains, similarly as the first one, an initial charge of 4.5 g. of the same catalyst used in Example 5, and a microporous metal filter is employed in both reactors to prevent the catalyst from flowing out of the reactors.

*Example 7*

Example 6 is repeated except that in lieu of the microporous metal filters in the reactors, the catalyst is permitted to flow from one reactor to the other and is withdrawn with the effluent and separated therefrom by centrifuging. The separated catalyst is then recycled with fresh nitro feed to the first reactor, adding additional catalyst as makeup catalyst to bring the catalyst concentration up to the desired level.

Example 8

The procedure of Example 1 is repeated employing the following nitro compounds:

(a) 5-chloro-3-nitro toluene
(b) 2-chloro-4-nitro toluene
(c) 6-chloro-4-nitro-1,2-dimethyl benzene
(d) 4-chloro-2-nitro-1,3-dimethyl benzene
(e) 4-chloro-2-nitro-1,3,5-trimethyl benzene Excellent yields are obtained.

Example 9

The procedures of Example 8 are repeated employing as the catalyst, however, 10 g. of a 5% palladium on alumina catalyst and the conditions maintained in the reactor are a temperature of 50° C. and a pressure of 50 p.s.i.g.

Example 10

Example 9 is repeated employing, however, as the catalyst 4.5 g. of a 5% palladium on carbon catalyst. The same conditions of temperature and pressure are used.

Since the temperature at which the catalyst reduction herein contemplated is from about 25° C. to about 125° C. and is carried out in the liquid phase in the absence of added solvent, it is understood that the chloronitro compound to be operable herein must be a liquid within the recited temperature range. Those compounds which are normally solid at room temperatures are of course employed in the reaction at elevated temperatures up to about 125° C. to effect liquefaction thereof. It is equally essential that the resulting amino compound be liquid at the selected temperatures. Therefore, where the amino compound has a higher melting point than the corresponding nitro body, the temperature employed during the reduction should be above the melting point of the amino compound.

Other variations in and modifications of the described processes which will be obvious to those skilled in the art can be made in this invention without departing from the scope or spirit thereof.

We claim:

1. In a method for reducing aromatic monocyclic carbocyclic monochloro compounds of the formula:

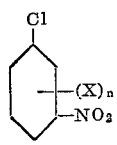

wherein X represents an alkyl substituent of from 1 to about 18 carbon atoms and $n$ has a value of from 0 to 4, to the corresponding amino compound in the liquid phase and in the absence of added solvent employing molecular hydrogen in the presence of a noble metal hydrogenation catalyst having a surface area of at least about 150 square meters per gram, and in which the reduction is carried out at a temperature of from about 25° C. to about 125° C. while maintaining the water produced during the course of the reaction in the reaction zone during the reduction as a separate liquid phase in a well dispersed state throughout the reaction zone by means of sufficient agitation of the liquid phase to effect such dispersion, the improvement which comprises conducting the reduction in the presence of sodium acetate.

2. A method as defined in claim 1 wherein the nitro compound is 3-chloronitro benzene.

3. A method as defined in claim 1 wherein the nitro compound is 4-chloro-2-nitro toluene.

4. A method as defined in claim 1 wherein the nitro compound is 5-chloro-3-nitro toluene.

5. A method as defined in claim 1 wherein the nitro compound is 2-chloro-4-nitro toluene.

6. A method as defined in claim 1 wherein the nitro compound is 6-chloro-4-nitro-1,2-dimethyl benzene.

7. A method as defined in claim 1 wherein the nitro compound is 4-chloro-2-nitro-1,3,5-trimethyl benzene.

8. A method as defined in claim 1 wherein the catalyst is a palladium on carbon catalyst.

9. A method as defined in claim 1 wherein the catalyst is a palladium on alumina catalyst.

10. A method as defined in claim 1 wherein the catalyst is a platinum on carbon catalyst.

11. A mehod for reducing 3-chloronitro benzene to 3-chloroaniline in the absence of added solvent which comprises reducing the said 3-chloronitro benzene in the liquid phase with molecular hydrogen in the presence of a palladium on carbon catalyst having a surface area of at least about 150 square meters per gram, and in the presence of sodium acetate the said reduction being carried out at a temperature of about 80° C. while maintaining the water of reaction as a well dispersed separate liquid phase in the reaction zone during the reduction.

12. A method as defined in claim 11 wherein the catalyst is a 5% palladium on carbon catalyst and the amount employed is about 0.1% by weight of catalyst based on the weight of the 3-chloronitro benzene.

References Cited in the file of this patent

UNITED STATES PATENTS

| | | |
|---|---|---|
| 2,619,503 | Benner et al. | Nov. 25, 1952 |
| 2,772,313 | Trager | Nov. 27, 1956 |

FOREIGN PATENTS

| | | |
|---|---|---|
| 832,153 | Great Britain | Apr. 6, 1960 |
| 848,626 | Great Britain | Sept. 21, 1960 |